United States Patent [19]

Copson et al.

[11] Patent Number: 4,829,923

[45] Date of Patent: May 16, 1989

[54] SEWAGE DISPOSAL

[75] Inventors: Alexander G. Copson; Mirza N. Baig, both of London, England

[73] Assignees: The Maersk Company Limited, London, England; General Environmental Technologies Limited, Isle of Main

[21] Appl. No.: 244,574

[22] Filed: Sep. 12, 1988

Related U.S. Application Data

[63] Continuation of Ser. No. 2,298, Jan. 5, 1987, abandoned.

[30] Foreign Application Priority Data

Jan. 6, 1986 [GB] United Kingdom .............. 8600188
Feb. 24, 1986 [GB] United Kingdom .............. 8604504

[51] Int. Cl.[4] ........................................ B63B 35/30
[52] U.S. Cl. ........................ 114/27; 405/154; 114/26; 114/270; 414/137.7
[58] Field of Search .................... 114/26–38, 114/114 B, 264, 265, 270; 414/138, 140; 405/154; 137/236.1; 141/1

[56] References Cited

U.S. PATENT DOCUMENTS

| | | | |
|---|---|---|---|
| 3,595,161 | 7/1971 | Webb | 100/35 |
| 4,117,941 | 10/1978 | McCleskey et al. | 114/265 |
| 4,205,379 | 5/1980 | Fox et al. | 114/144 B |
| 4,400,115 | 8/1983 | Biancale et al. | 405/303 |

FOREIGN PATENT DOCUMENTS

| | | | |
|---|---|---|---|
| 0000075 | 12/1978 | European Pat. Off. . | |
| 69388 | 6/1978 | Japan | 114/27 |
| 27190 | 3/1979 | Japan | 114/26 |
| 97983 | 8/1979 | Japan | 114/26 |
| 58-202182 | 11/1983 | Japan . | |
| 2004817 | 4/1979 | United Kingdom . | |
| 2041297 | 9/1980 | United Kingdom . | |
| 2098139 | 11/1982 | United Kingdom . | |

*Primary Examiner*—Sherman D. Basinger
*Assistant Examiner*—Stephen P. Avila
*Attorney, Agent, or Firm*—Flynn, Thiel, Boutell & Tanis

[57] ABSTRACT

Treated sewage is loaded into the tanks of a large ocean-going tanker, transported therein to a deep water site, and then deposited directly onto the seabed at that site through piping deployed from the vessel and extending downwardly therefrom. The piping may be a flexible hose, or a string of steel pipes, or a combination of the two. The piping may be deployed over the side of the vessel, or preferably from a moon pool. The depth of the seabed for deposit might for example be one thousand or fifteen hundred meters, or considerably deeper, e.g., 7000 m; in extremely deep water it may not be necessary for the piping to extend fully to the seabed, although it is recommended that it extend at least below the depth at which the majority of fish are found and below the depth where there are significant thermal changes. The disposal tanker is provided with a hose reel and/or pipe erection plant and/or equipment for handling piping and for deploying the disposal piping from the tanker to the deep seabed disposal region.

10 Claims, 3 Drawing Sheets

SEWAGE DISPOSAL

This application is a continuation of U.S. Ser. No. 002,298, filed Jan. 5, 1987, now abandoned.

BACKGROUND OF THE INVENTION

The present invention relates to sewage disposal. Currently, treated sewage, e.g. digested sludge, is commonly disposed of by simple dumping in shallow inshore waters, usually from barges or by direct pumping through pipelines from onshore sites. This is leading to an unacceptable build-up in the inshore environment of toxic substances such as heavy metal compounds.

According to the present invention, treated sewage such as digested sludge is loaded into the tanks of a large ocean going tanker [e.g. an oil/bulk ore (OBO) vessel, or a large, very large or ultra large crude carrier], transported therein to a deep water site, and then deposited directly onto the seabed at that site through piping deployed from the tanker and extending downwardly therefrom. The piping may be a flexible hose (e.g. plastics tubing in continuous or segmented form), or a string of steel pipes, or a combination of the two—in which case a hose portion descend from the vessel and connect with a pipe string extending the remainder of the way. The piping may be deployed over the side of the vessel, or from a moon pool. The depth of the seabed for deposit might for example be one thousand of fifteen hundred meters, or considerably deeper, e.g. 7000 m; in extremely deep water it may not be necessary for the piping to extend fully to the seabed, although it is recommended that it extend at least below the depth at which the majority of fish are found (the "fish line") and below the depth where there are significant thermal changes. At depth of about 4000 meters or more it is preferred to release the sewage sludge close to the ocean bed. The height of the point of release above the bed is a function of the relative densities of the sewage sludge and the sea water at the release depth, the release rate, and the buoyancy frequency of sea water. It is currently considered that an optimal release height in deep water is about 350 m above the abyssal plain.

Treated sewage as currently received for disposal is usually an aqueous digested sludge having a dry solids content of 10 to 5 wt.% or less; this may be concentrated, e.g. by partial de-watering by centrifuge or the like before or after loading onto the disposal tanker; such partially de-watered slurry may be re-diluted on board the tanker before seabed deposit if this should be necessary for ease of pumping. The treated sewage taken on board the disposal tanker may if desired be further treated on board before seabed disposal; the sewage may have added thereto various microorganisms to assist in breakdown and degradation of the deposited matter. The disposal tanker may be provided with an onboard laboratory for analysing sewage and also water samples before and after disposal.

The invention not only provides a disposal procedure as described above, but also the disposal tanker per se, provided with a hose reel and/or pipe erection plant and/or equipment for handling piping and for deploying the disposal piping from the tanker to the deep seabed disposal region. When piping is deployed over the side of the vessel the tanker hull may be used to provide a weathershield by allowing the tanker to be beam-on to wind and waves. Pipe erection plant e.g. pipe handling derricks may be accommodated within the hold space of the tanker, or may be on deck and shielded from the elements by some suitable superstructure or housing.

BRIEF DESCRIPTION OF THE DRAWINGS

Embodiments of the present invention will now be described in detail, by way of example only, with reference to the drawings in which.

In the drawings, unless otherwise stated, like numerals are used to refer to like parts.

DETAILED DESCRIPTION

Figure 1:
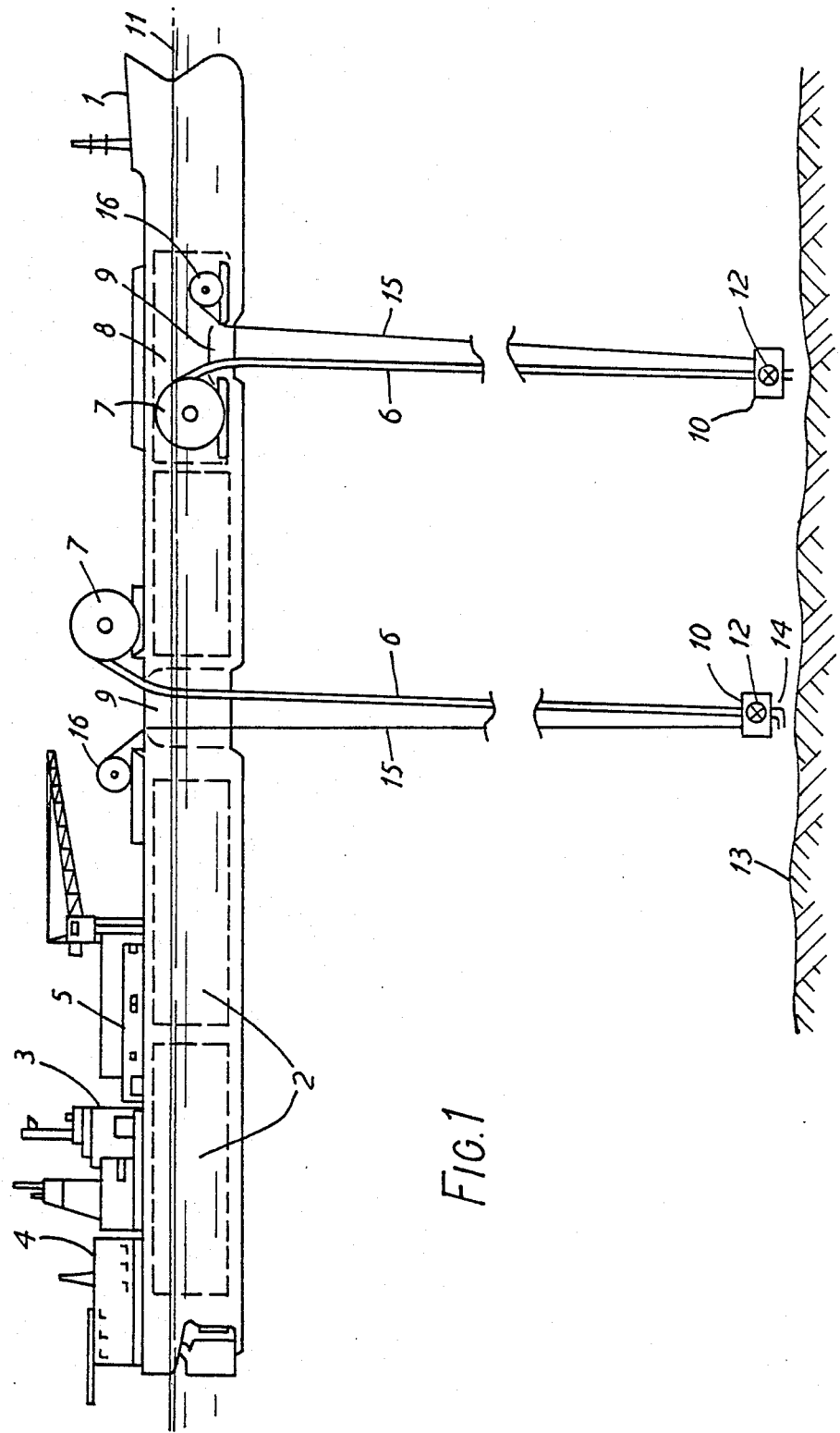
FIG. 1 is a schematic representation of a disposal tanker with hose reel equipment.

As shown in FIG. 1 the disposal tanker 1 has holds 2 for carrying sewage. The total storage space within the tanker is e.g. 500,000 m$^3$, of which about 80% may be utilised for sewage storage. The tanker is of generally conventional type, having holds 2 below deck, a bridge 3 and accommodation units 4 above deck. Laboratory facilities 5 for carrying out microbiological and biochemical procedures are also provided.

The piping used for sewage disposal comprises a continuous extruded plastics hose 6 of about 7000 m length wound on a hose reel 7. The internal diameter of the hose is e.g. 0.5 m. The reels 7 illustrated have horizontal axes of rotation; equally they could be laid flat for rotation about a vertical axis. The approximate dimensions of a reel holding 7000 m of hose is 25 m diameter and 7 m width. One advantage of continuous extruded plastics hose is that it can be produced at the dockside and wound directly onto the hose reel while the tanker is in harbour. Conventional plastics extrusion plant could be used to generate suitable continuous plastics hose at a rate of about 1000 m per day.

A number of hose reels can be carried on a tanker; in the embodiment illustrated one reel 7 is mounted below deck in hold 8 and another reel is mounted on deck. The deck mounted reel could, of course, be weather-shielded.

The hoses 6 are deployed through moon pools or wells 9 in the tanker hull. At the submerged end of a hose there is carried a weight 10 which prevents the pipe end drifting up towards the sea surface 11. At the hose end there is optionally provided a pump 12, powered via a cable from onboard the tanker, which creates a demand in the hose and so assists sewage flow through the hose, thereby improving the rate of disposal onto the seabed 13. It is presently estimated that a 0.5 m hose would allow an unassisted flow rate (i.e. by gravity alone) of around 1000 tonne/h. The hose end may be directed towards the seabed, or may be steerable (e.g. by provision of a swivellable elbow 14) so as to allow some control over the weighted hose end by utilising the thrust of a directed jet of sewage.

A plastics hose in water is generally neutrally or slightly positively buoyant. The combined weight of the deployed hose, weights, pumps etc. is supported by one or more cables 15 controlled by winches 16.

The tanker is provided with suitable pipework (not shown) for feeding sewage to the hose for disposal.

Figure 2:
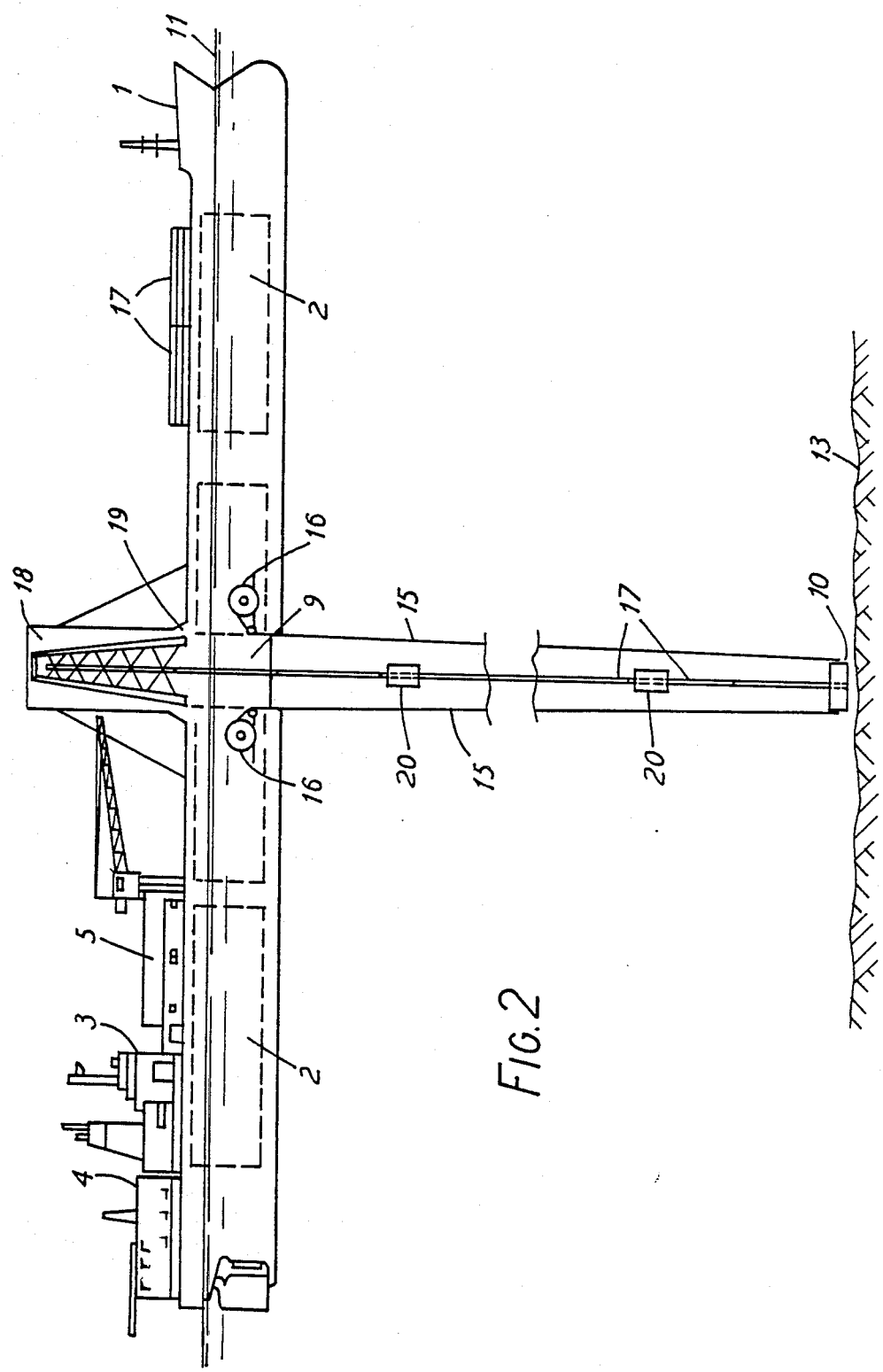
FIG. 2 is a schematic representation of a disposal tanker with pipe erection plant.

In the embodiment of FIG. 2, the piping used for sewage disposal is made up of sections 17. These are generally steel pipe sections, although other rigid materials may be used, e.g. glass fibre in order to reduce weight. Pipe sections 17 are stored on deck ready for incorporation into the pipe string.

Pipe sections are joined together to form the string using a pipe derrick 18 on a weather shielded pipe deck 19. The pipe string is deployed through a moon pool 9 in the tanker hull.

The submerged pipe end is weighted 10 and the pipe weight is supported by cables 15 controlled by winches 16. A steel pipe of several thousand meters length has considerable weight, and consequently buoyant collars 20 may be used to reduce the load in the pipe string and on the cables. As in the previous embodiment of FIG. 1, a subsea pump and/or steerable pipe opening may optionally be provided.

In any case, while sewage is being deposited on or near the seabed, the tanker will be making some way; about half a knot is considered to be satisfactory. The tanker may be allowed to drift, or it may be propelled by its engines (e.g. at a rate of ½ knot in reverse).

Figure 3:
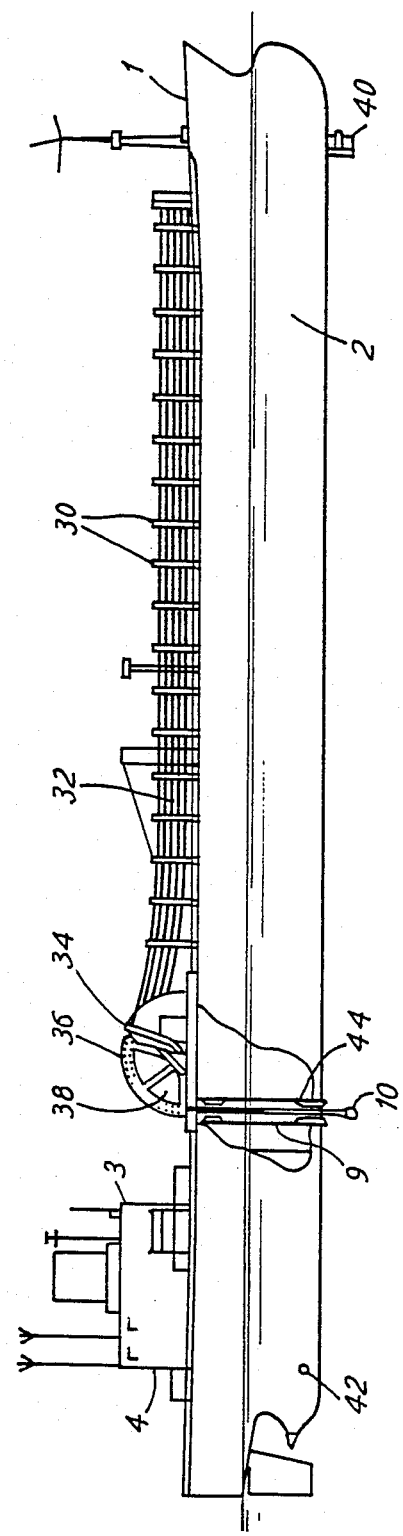
FIG. 3 is a schematic representation of a disposal tanker with equipment for handling plastics tubing in segmented form.

The presently preferred embodiment is illustrated in FIG. 3. The deep ocean discharge vessel is a tanker 1 of about 100,000 tonnes dead weight. Such a vessel is preferred for its combination of stability in heavy weather, its draft which is sufficiently shallow to allow approach close to existing sewage terminals, and its economic efficiency. The tanker carries racks 30 in which are stacked sections of plastics discharge piping 32. The piping 32 suitably comprises up to 150 meter lengths of flexible high density polyethylene piping of about 0.45 m diameter.

Individual pipe lengths may be selectively taken from the pipe racks by means of a fully articulated stacker arm 34. As each pipe length is taken from the stack it is joined—for example by clamping—to the preceding pipe length and then passed over rollers 36 on a pipe guide quadrant 38 and deployed through a moon pool 9. In order to facilitate passage of the pipe over the quadrant some of the rollers may be driven. As an alternative the pipe guide quadrant could be replaced by a rotatable pipe guide wheel. The deployed piping is supported by guide-line cables or ropes controlled by winches (not shown). The guide-lines are also used to retrieve the deployed piping when it is desired to restow the pipes.

At the outlet end of the discharge pipe there is provided a dropweight of about 40 tonne, which is designed to overcome the drag effects of ocean currents. The deployed piping will not, of course, hang directly below the moon pool opening but will instead adopt a curved profile dependant on the currents at various depths and the direction of movement of the tanker. The dropweight is equipped with depth sensing instrumentation and transponders are fixed at predetermined intervals along the deployed pipe, thereby allowing the underwater aspect of the pipe to be determined on board the tanker. If the outlet end of the pipe should rise, the tanker can move in the direction of the dropweight thereby reducing the guide-line tension and allowing the dropweight to sink. Conversely, should the dropweight sink too close to the seabed, the vessel can sail slowly away causing the deployed piping to regain its correct height from the bed.

A dynamic positioning system using a combination of azimuth and tunnel thrusters 40,42 keeps the tanker head into the weather during deployment of the piping, and maintains the position of the dropweight and piping relative to the seabed during discharge by utilising data derived from the depth sensor and transponders.

The operation of this deep ocean discharge vessel for sewage disposal will now be described. The vessel can lie at anchor close by a sewage terminal. Small feeder barges (e.g. 1500 to 4000 dwt.) can transport sewage sludge from the terminal to the vessel. Desirably, a gas return system is employed in order to prevent the escape of displaced gas from the tanker holds in order to avoid atmospheric pollution. Once loaded, the tanker will proceed to a designated deep water dump site. At the dump site the required number of pipe lengths is determined and these are selected from the pipe racks, joined and deployed through a moon pool. The ships pumps are used to discharge the sewage sludge from the holds, through the piping and onto the ocean bed. The rate of pumping may be of the order of 1000 tonnes per hour. After the sewage has been discharged the holds and pipeline may be thoroughly washed and the washings discharged to the ocean bed.

When sewage disposal has been completed the piping is retrieved and restacked in the pipe racks. The tanker then proceeds under normal navigation to its loading anchorage close to the sewage terminal. During the voyage to and from the loading terminal the outlet end of the discharge pipe together with the dropweight may be locked into a moon pool cursor 44 so as to close off the moon pool. The cursor is a passive sliding guide capable of running freely on rails set in the moon pool wall. The cursor is raised and lowered by raising and lowering of the dropweight.

Whilst the embodiments illustrated have deployed piping through one or more moon pools in the tanker hull, it is to be understood that in any case piping could be deployed over the side of the tanker.

We claim:

1. An ocean-going tanker for use in a method of sewage disposal and having tanks in which sewage is loaded, transported in the tanker to a deep water site, and then deposited directly onto the seabed at that site through piping deployed from the tanker and extending downwardly therefrom, the tanker being provided with a moon pool in the tanker hull, a rack stacked with individual horizontally-elongated lengths of flexible pipe, means for taking pipe lengths from the rack and joining consecutive lengths together, and means for guiding joined pipe lengths vertically through the moon pool for deploying piping from the tanker to a water depth of about 4000 m or more for depositing sewage directly onto the seabed at a deep water site.

2. A tanker according to claim 1, including means for bending the individual flexible pipe lengths from an elongate substantially horizontal orientation through an angle of about 90° into a substantially vertical orientation in alignment with the moon pool.

3. A tanker according to claim 2, wherein said bending means includes a pipe guide quadrant having rollers over which the pipe lengths are deployed.

4. A tanker according to claim 1, wherein the flexible pipe lengths are of plastic.

5. A tanker according to claim 1 provided with a dropweight at the outlet end of the piping, and provided with one or more guideline cables or ropes controlled by one or more winches for supporting the weight of the deployed piping.

6. A tanker according to claim 1 wherein the deployed piping carries at least one depth sensor at its outlet end.

7. A tanker according to claim 4 wherein the deployed piping carries transponders at predetermined intervals along its length.

8. A method of sewage disposal using an ocean-going tanker, in which the tanker is provided with a moon pool in the hull, a rack stacked with individual horizontally-elongated lengths of flexible pipe, means for taking pipe lengths from the rack and joining consecutive lengths together, and means for guiding joined pipe lengths vertically through the moon pool for deploying piping from the tanker to a water depth of about 4000 m or more, comprising the steps of loading sewage into the tanks of the ocean-going tanker, transporting the sewage in the tanker to a deep water site, deploying the piping from the tanker through the moon pool to a water depth of about 4000 m or more, and then depositing sewage directly onto the seabed at that site through the piping with the sewage being released from the piping close to but above the seabed.

9. A method according to claim 8 wherein the sewage is an aqueous digested sewage sludge having a dry solids content of 10 to 5 wt.% or less.

10. A method according to claim 8 including the steps of determining, at least partly, the depth of the deployed piping relative to the seabed by backward and/or forward motion of the tanker under control of a dynamic positioning system.

* * * * *